(12) United States Patent
Zhou et al.

(10) Patent No.: US 7,630,998 B2
(45) Date of Patent: Dec. 8, 2009

(54) PERFORMING A DELETION OF A NODE IN A TREE DATA STORAGE STRUCTURE

(75) Inventors: Lidong Zhou, Sunnyvale, CA (US); Chandramohan A. Thekkath, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 70 days.

(21) Appl. No.: 11/149,593

(22) Filed: Jun. 10, 2005

(65) Prior Publication Data
US 2006/0282438 A1 Dec. 14, 2006

(51) Int. Cl.
*G06F 17/00* (2006.01)
*G06F 7/00* (2006.01)
(52) U.S. Cl. .................................. 707/101; 707/103 R
(58) Field of Classification Search .................. 707/1, 707/4, 8, 10, 100, 102, 103 R, 104.1, 200, 707/201, 202, 203, 204, 205; 709/217, 220, 709/223, 226; 717/5, 162
See application file for complete search history.

(56) References Cited

U.S. PATENT DOCUMENTS

| | | | | |
|---|---|---|---|---|
| 5,243,596 | A * | 9/1993 | Port et al. ........................ 370/231 |
| 5,276,874 | A * | 1/1994 | Thomson ........................ 707/102 |
| 5,506,983 | A * | 4/1996 | Atkinson et al. ................ 707/1 |
| 5,508,983 | A * | 4/1996 | Nakamura et al. ........ 369/47.31 |
| 6,009,427 | A * | 12/1999 | Wolff ........................... 707/10 |
| 6,067,545 | A * | 5/2000 | Wolff ........................... 707/10 |
| 6,192,051 | B1 * | 2/2001 | Lipman et al. ............... 370/389 |
| 6,473,849 | B1 * | 10/2002 | Keller et al. .................. 712/30 |
| 6,532,457 | B1 * | 3/2003 | Tal et al. ....................... 707/1 |
| 2005/0114595 | A1 * | 5/2005 | Karr et al. .................... 711/114 |

OTHER PUBLICATIONS

Lehman, P.L. et al., "Efficient Locking for Concurrent Operations on B-Trees", *ACM Transactions on Database Systems*, Dec. 1981, 6(4), 650-670.
MacCormick, J. et al., "Boxwood: Abstractions as the Foundation for Storage Infrastructure", *Microsoft Research Silicon Valley*, 8 pages 2004.
Sagiv, Y., "Concurrent Operations on B*-Trees with Overtaking", *Journal of Computer and System Sciences*. 1986, 33, 275-296.

* cited by examiner

*Primary Examiner*—Charles Rones
*Assistant Examiner*—Daniel Kuddus
(74) *Attorney, Agent, or Firm*—Woodcock Washburn LLP

(57) ABSTRACT

The addition of a layer between a tree data storage structure and a persistent storage is disclosed. The additional layer, called a storage module, generates an identifier and allocates it to a node in the tree data storage structure. The storage module additionally performs a mapping function, allocating the identifier to a location in persistent storage. If the node is later deleted from the tree data storage structure, then the mapping of the identifier to the location in persistent storage is likewise deleted. In this way, if the node is deleted and, concurrently, a lookup or write operation is attempted on the deleted node, the storage module will read the identifier associated with the deleted node but will not be able to map the identifier to a location in persistent storage. Instead, an exception is generated and sent to the tree data storage module.

15 Claims, 7 Drawing Sheets

410
Mapping

| Node | Unique ID | Disk | Persistent storage | |
| --- | --- | --- | --- | --- |
| | | | Offset | Size |
| N0 | 00000001 | 1 | 0 | X |
| N1 | 00000010 | 1 | 10 | Y |
| N2 | 00000011 | 1 | 20 | Z |
| N3 | 00000100 | 2 | 0 | X |
| etc. | etc. | etc. | etc. | etc. |
| Nx | 111000111 | 4 | 35 | Z |
| etc. | etc. | etc. | etc. | etc. |
| Nx' (added after N0 deleted) | 111010111 | 1 | 0 | X |

FIG. 4

PERFORMING A DELETION OF A NODE IN A TREE DATA STORAGE STRUCTURE

RELATED APPLICATIONS

This application is related to U.S. patent application Ser. No. 11/149,656 entitled "Implementing A Tree Data Storage Structure In A Distributed Environment" filed herewith and incorporated by reference in its entirety.

FIELD OF THE INVENTION

The invention generally relates to data storage and specifically to tree data storage structures providing concurrent operation execution.

BACKGROUND OF THE INVENTION

Tree data storage structures such as B-trees and variations of B-trees (e.g., B*trees, B+trees), binary trees, and others are used for storing large files of information on secondary storage and for supporting insertion, lookup, deletion, and enumeration operations. Many tree data storage structures allow operations to be performed concurrently. Some tree data storage structures support concurrent operations by locking only portions of the structure, allowing operations involving other portions of the structure to continue concurrently. Such locking mechanisms are discussed, for example, in P. L. Lehman and S. B. Yao, *Efficient Locking for Concurrent Operations on B-Trees*, ACM Transactions on Database Systems, vol. 6, no. 4, pp. 650-670 (1981).

Primarily because locking mechanisms may be complicated, other tree data storage structures support concurrent operations by using an altered structure in the tree data storage structure. An example of such a structure, proposed by Lehman and Yao, is a B-link tree, which uses additional pointers to allow for more concurrent operations. Promoting concurrency and diminishing a focus on locking by changing the structure of the tree data storage structure is discussed in Y. Sagiv, *Concurrent Operations on B*-Trees with Overtaking*, Journal of Computer and System Sciences, vol. 33, no. 1, pp. 275-296 (1986).

The increase in concurrency offered by structures such as B-link trees may, however, pose problems during execution of concurrent operations caused by node deletion. The tree may be compacted as nodes are deleted, and the tree may be re-balanced to promote, for example, efficient execution of operations. A deletion algorithm such as that discussed in Sagiv may start a background thread to perform compaction and tree rebalancing. Because the background compression may delete empty nodes, a traversal operation may encounter a node that has been deleted and result in confusion, delay, and inefficiency. For example, unless there is an indication that a node has been deleted, storage allocated to deleted nodes may not be deallocated and reused until there is certainty that no reference to the deleted nodes will be used in some concurrent B-tree operations. Obtaining certainty that no reference to deleted nodes is active is difficult, especially in a distributed B-tree implementation, and the deallocated space therefore may not be reused promptly.

Thus, there is a need for efficient systems and methods for detecting deleted nodes in a tree data storage structure that provides for concurrent operations. The systems and methods should avoid complicated locking schemes, promote concurrency, and detect the deleted nodes to allow for restarting a traversal higher up in a tree structure. The systems and methods should include generating an exception when a pointer to a node that has been deleted is encountered.

SUMMARY OF THE INVENTION

The invention provides for detecting deleted nodes in a tree data storage structure, generating an exception when pointers of deleted nodes are encountered, and allowing for restarting a traversal higher up in the tree structure. The invention includes adding a layer in between a tree data storage structure and an associated persistent storage. The additional layer, called a storage module, generates a unique identifier which has a purpose similar to a pointer, and allocates it to a node in the tree data storage structure. Such an identifier may not have been previously associated with any other node in the tree data storage structure. The storage module additionally performs a mapping function, allocating the identifier to a location in persistent storage. In this way, when a lookup operation is performed regarding a node, the node's identifier is mapped or correlated to the location in persistent storage. Data saved at the location is then read and the lookup operation is satisfied.

If the node is later deleted from the tree data storage structure, then the mapping of the unique identifier to the location in persistent storage is likewise deleted. In this way, if the node is deleted and, concurrently, an operation is attempted on the deleted node, the storage module will be polled to retrieve information associated with the node stored in the persistent storage. The storage module may read the identifier associated with the deleted node but may not be able to map the identifier to a location in persistent storage, as the identifier was deallocated from the location when the node was deleted. Instead, an exception may be generated and sent to the tree data storage module. The tree data storage module may then appropriately address the exception by, for example, starting the traversal higher in the tree data storage structure and retry.

BRIEF DESCRIPTION OF THE DRAWINGS

The foregoing summary and the following detailed description of the invention are better understood when read in conjunction with the appended drawings. Embodiments of the invention are shown in the drawings, however, it is understood that the invention is not limited to the specific methods and instrumentalities depicted therein. In the drawings:

FIG. 4 is a graphical depiction of a mapping of unique identifiers to nodes of a tree data storage structure and to locations in persistent storage;

DETAILED DESCRIPTION OF ILLUSTRATIVE EMBODIMENTS

Example Computing Environment

Figure 1:
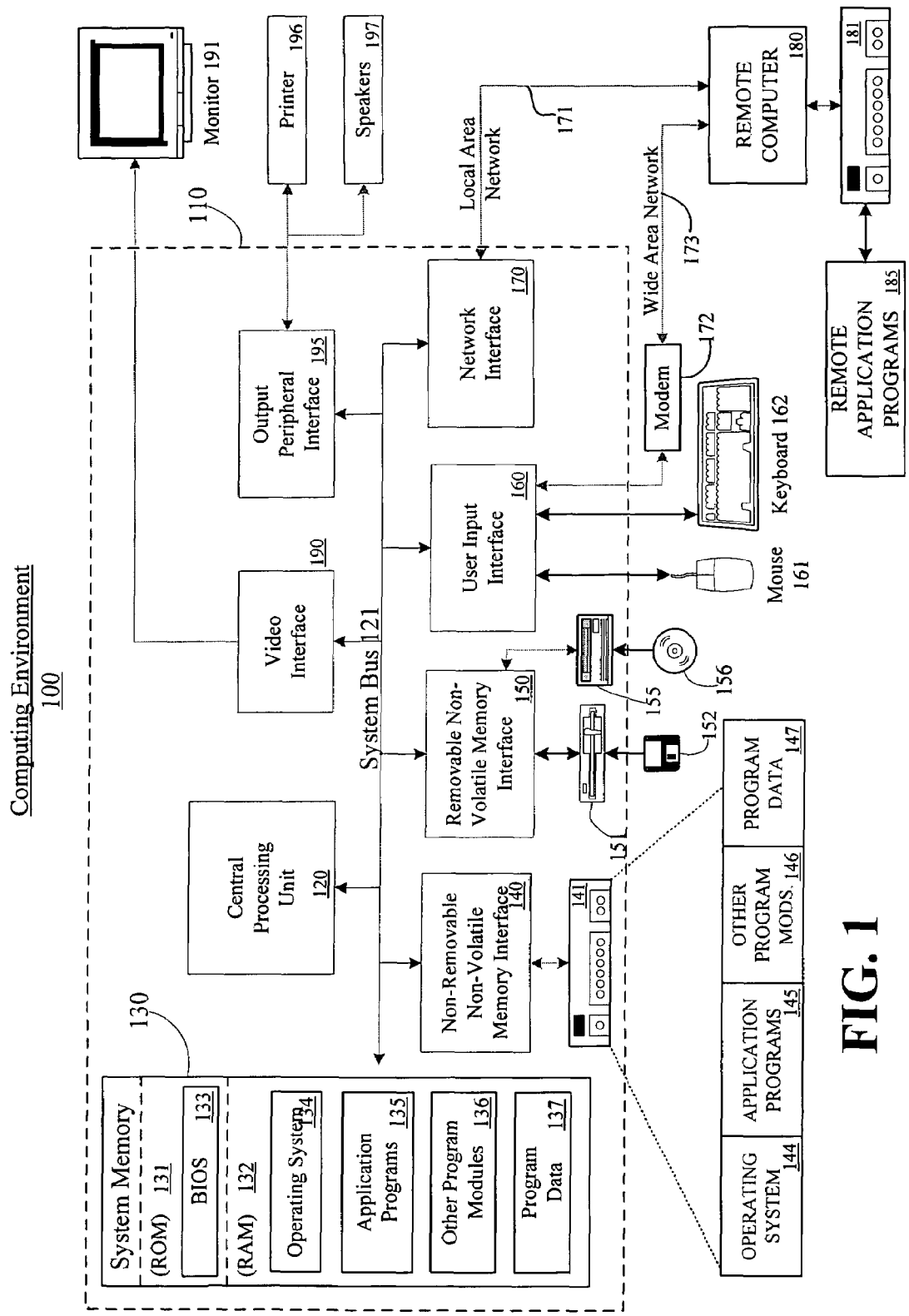
FIG. 1 is a block diagram showing an example computing environment in which aspects of the invention may be implemented.

FIG. 1 and the following discussion are intended to provide a brief general description of a suitable computing environment 100 in which an example embodiment of the invention may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The term "data" refers to any information of any form, including commands, transfers, notifications, or requests. The terms "program code" and "code" refer to any set of instructions that are executed or otherwise processed by a processor.

The term "tree data storage structure" refers to any storage system or structure such as binary trees, B-trees or variants of B-trees, or other similar structures that provide an indexing of stored information. The tree data storage structure includes nodes branching out from a root node, where each node may include information consisting of one or more keys, an operation (such as less-than or greater-than) and/or information, typically referred to as a "pointer," regarding a descendent node. Such structures may be used for storing large files of information and such information may be stored on a secondary storage device such as a disk. The term "identifier" refers to a form of or a substitute for a pointer of a node of a tree data storage structure that may be used to identify only one past or present node of a tree data storage structure and is used to map the node to a location in persistent storage. The term "persistent storage" refers to any type of computer storage media including but not limited magnetic discs, magnetic tapes, bubble memory, RAM, ROM, EEPROM, flash memory or other memory technology, CDROM, DVD or other optical disk storage, magnetic disk storage or other magnetic storage devices, or any other storage medium whose contents are preserved when its power is off.

While a general purpose computer is described below, this is merely one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented, although as made clear above, the computing system environment 100 is only one example of a suitable computing environment and is not intended to suggest any limitation as to the scope of use or functionality of the invention. Nor should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a central processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The system memory 130 includes computer storage media in the form of volatile and/or nonvolatile memory such as ROM 131 and RAM 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

EXAMPLE EMBODIMENTS

Figure 2:
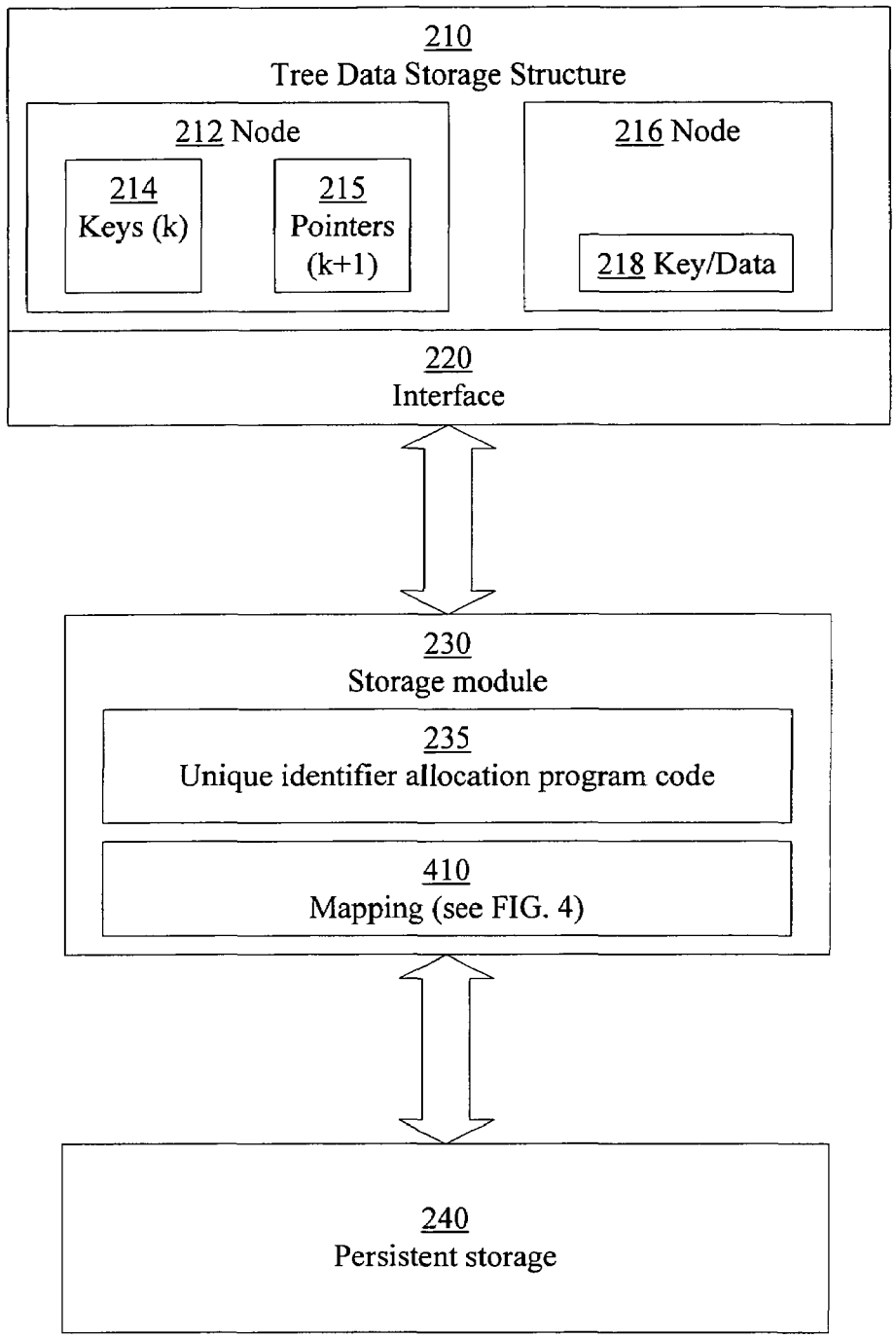
FIG. 2 is a block diagram of an example system for performing deletion of a node in a tree data storage structure according to an embodiment of the invention.

FIG. 2 is a block diagram if an example system 200 for performing deletion of a node in a tree data storage structure. The system 200 may include a tree data storage structure 210, a storage module 230, and a persistent storage 240. The system 200 may be part of a computer such as the computer 110 described with regard to FIG. 1. The system 200 enables a computer such as the computer 110 to generate, for example, an exception if a node in the tree data storage structure 210 has been deleted.

The tree data storage structure 210 may be capable of satisfying, for example, a lookup operation concurrently with an insertion operation or an insertion operation concurrently with a deletion operation, such operations being known to those skilled in the art. That is, the tree data storage structure 210 may be any tree data storage structure capable of satisfying concurrent execution of operations. The tree data storage structure 210 may include nodes 212, 216, and each node 212, 216 may include one or more keys, exemplified by keys 214, 218. For example, the node 212 may include k number of keys. Additionally, the node 212 may include a k+1 number of pointers 215 to other nodes within the data tree storage structure 210. Nodes such as the node 216 may include a key-data pair 218. Those skilled in the art additionally will understand that such key-data pairs 218 may be located in leaf nodes, internal nodes, or both leaf and internal nodes depending on the type of tree data storage structure.

The tree data storage structure 210 may be in communication with or, alternatively, part of the storage module 230. The tree data storage structure 210 may communicate with the storage module 230 by any other appropriate means or methods. The storage module 230 may include identifier allocation program code 235 and a mapping 410 of identifiers to nodes 212, 216 of the tree data storage structure 210 and to locations within the persistent storage 240.

The identifier allocation program code 235 may be, for example, executed by an operating system on a computer such as the computer 110. The identifier allocation program code 235 may include instructions for creating and allocating, that is, designating, a unique identifier to a location in the persistent storage 240. The storage module 230 may perform various operations using the unique identifiers. For example, a read operation may be performed to read the unique identifier, and data may be written to the unique identifier. Additionally, the storage module 230 may deallocate the unique identifier and thus disassociate the unique identifier from the location in the persistent storage 240.

When a node is inserted into the tree data storage structure 210, the structure 210 may call the storage module 230 for an allocation of a unique identifier to the inserted node. The identifier allocation program code 235 may be executed and an identifier may be allocated to the inserted node. If the inserted node is the node 216, for example, and it is later deleted, the identifier is deallocated from the persistent storage 240. According to one embodiment of the invention, no identifier that is deallocated from persistent storage is allocated to a second node. That is, no identifier is reused. In this way each node 212, 216 is allocated with an identifier that is uniquely different from all other identifiers, whether allocated or deallocated. Thus, the storage module 230 may be thought of as a layer between the tree data storage structure 210 and the persistent storage 240, providing a unique mapping of nodes 212, 216 with locations in the persistent storage 240 through the use of the identifiers. The storage module 230 may store the mapping 410, which may be thought of as a table associating each node 212, 216 with an identifier and each identifier with a location in the persistent storage 240.

Those skilled in the art may equate a "pointer" or "handle" with an identifier, but prior art pointers or handles may not uniquely map a node to a location in persistent storage. For example, a pointer associated with a node Z may "point" to data Z stored at location Z in a persistent storage. The location Z may be identified by, for example, a disk number, and an offset on the disk. If the node Z is deleted, a new pointer associated with node Y may "point" to data Y newly saved to location Z, overwriting data Z. Because operations within the tree data storage structure 210 may be performed concurrently, a read operation associated with the deleted node Z may be performed, and the pointer "pointing" to location Z may result in the data (data Y) at location Z being read. Thus without the storage module 230, data Y may erroneously be read. In an embodiment of the invention, however, use of the storage module 230 may generate an exception under these circumstances, indicating that the identifier does not map to a location in the persistent storage and enabling the tree data storage structure 210 to restart a traversal higher up in the tree data storage structure 210.

An embodiment of the invention provides for generation of an exception without requiring substantial changes to the tree data storage structure 210. While more than one identifier may be allocated to a location in the persistent storage 240, no two identifiers are so allocated at one time. That is, an identifier may be allocated to a location in the persistent storage 240 if no other identifier is allocated to that location. If a node 212, 216 is deleted, then the identifier is deallocated from the location in the persistent storage 240. The storage module 230 may then allocate the storage location with a new identifier associated with, for example, a newly insert node. Thus, the storage module 230 provides for deallocating an identifier from a location in the persistent storage 240. In this way, instead of erroneous data being sent to the tree data storage structure 210, the storage module 230 may generate and send an exception, indicating that no location in the persistent storage 240 corresponds to the identifier allocated to a deleted node 212, 216.

Thus, in an embodiment of the invention, locations in the persistent storage 240 may be reused when nodes 212, 216 are deleted from the tree data storage structure 210 while promoting concurrent operations. This avoids encountering a deleted node and satisfying an operation erroneously. Instead, an exception may be generated, and the algorithm underlying the tree data storage structure 210 may be able to deal with such exceptions or may be revised to deal with such exceptions. Those skilled in the art will know how to perform such a revision.

Figure 3:
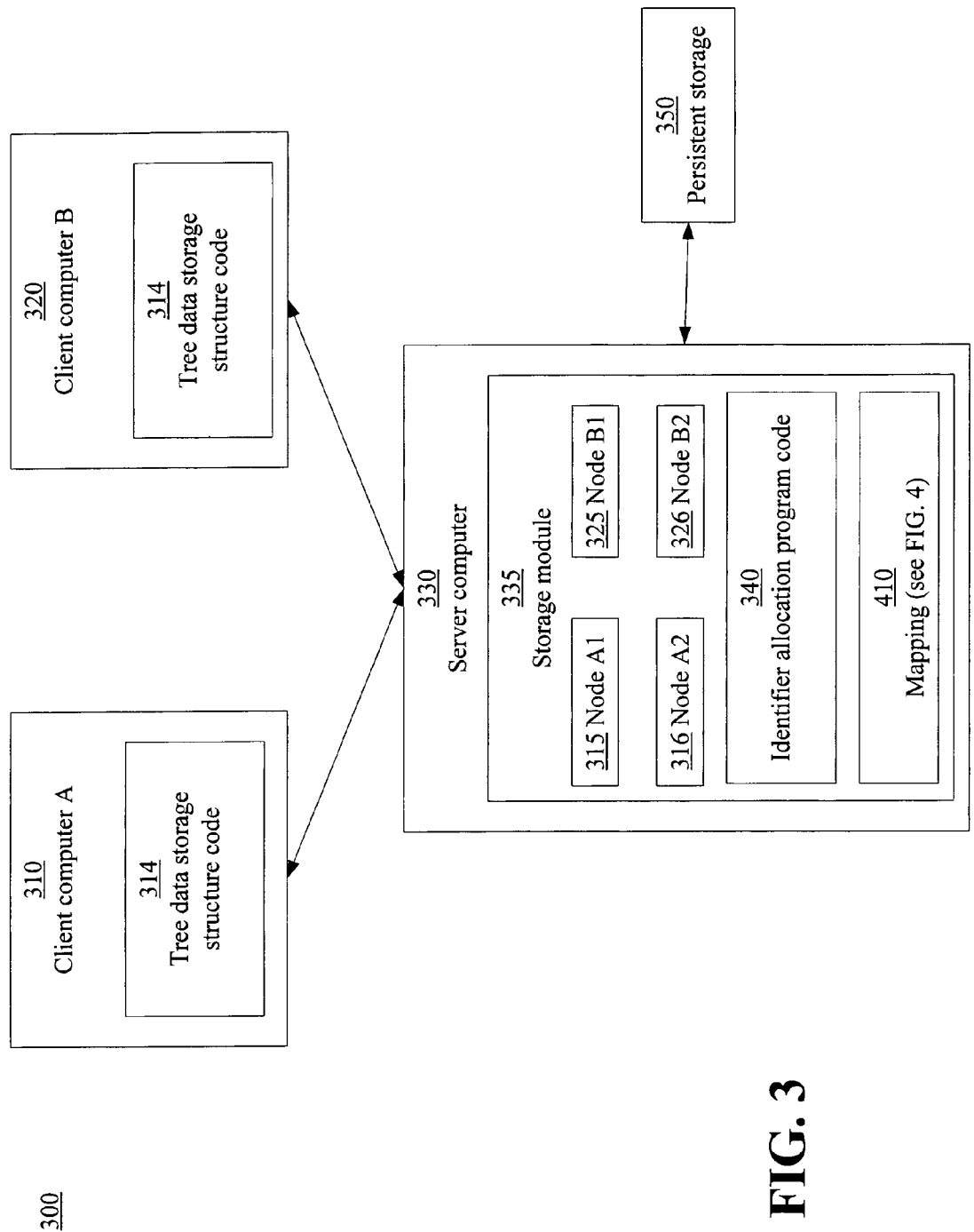
FIG. 3 is an alternative example embodiment of a system for performing deletion of a node in a tree data storage structure in which the structure is implemented in a distributed environment.

FIG. 3 is an alternative example embodiment of a system 300 for performing deletion of a node in a tree data storage structure where the tree data storage structure is implemented in a distributed environment. Implementing a tree data storage structure in a distributed environment is disclosed in U.S. patent application Attorney Docket Number MSFT 4872/310713.01 entitled "Implementing A Tree Data Storage Structure In A Distributed Environment" filed herewith and incorporated by reference in its entirety.

The system 300 may include a client computer A 310 communicatively coupled, that is, in communication with, a client computer B 320 through a server computer 330. Alternatively, the client computers 310, 320 may be in direct communication with each other. The server computer 330 may be in communication with a persistent storage 350. The client computers 310, 320 and the server computer 330 may form or be a part of a network, and the network may include other client or server computers (not shown). The server computer 330 may include a storage module 335 that includes nodes 315, 316, 325, 326, identifier allocation program code 340 and a mapping 410. The nodes 315, 316, 325, 326 may include keys, pointers, and/or data as described with regard to the nodes of FIG. 2. The storage module 335 and its contents (e.g., the identifier allocation program code 340 and the mapping 410) may be essentially the same as the storage module 230 and its contents as described with regard to FIG. 2. Likewise, the persistent storage 350 may be essentially the same as the persistent storage 240 described with regard to FIG. 2. The client computer A 310 may include tree data storage structure program code 314. The client computer B 320 also may include the tree data storage structure program code 314.

It will be understood that, in alternative embodiments of the invention, the storage module 335 may reside on a client computer such as the client computer A 310, or may reside elsewhere in a network. Additionally, the persistent storage 350 may reside on one or more computers such as the client computers 310, 320, the server computer 330 or elsewhere in a network.

FIG. 4 is a graphical depiction of the mapping 410 of identifiers to nodes of a tree data storage structure and to locations in persistent storage. The mapping 410 may include a listing of node identifiers 412, identifiers 414, and persistent storage locations 418. A location in persistent storage may be designated through a combination of factors such as, for example, a physical disk 416, an offset 420 on the disk, and a size 422 indicating the volume of space (e.g., bits) needed for the information to be stored. Alternative embodiments of the invention, it will be understood, may be implemented using other values for designating a location in persistent storage and such values may be based on the type of persistent storage.

The mapping may show a node identifier such as node N0. Node N0 may be mapped to a identifier pursuant to an allocation performed by a storage module as described above. The mapping 410 shows identifier 00000001 as being allocated to node N0. Additionally, the identifier 00000001 is allocated, pursuant to methods described above, to a persistent storage location identified as disk 1, at offset 0 on disk 1, for an amount of space equal to X. Thus, when a lookup operation, for example, is performed on node N0, the tree data storage structure may request to read information associated with node N0 from the storage module. The storage module may map the node N0 to the identifier 00000001, and then map the identifier to the persistent storage location of disk 1, at offset 0, having a size X. The storage module may then satisfy the read request by sending the information stored at that location. This process may be repeated for any nodes in the tree data storage structure. Alternatively, the node N0 on the tree data storage structure may include the identifier, similar to including a pointer on a node. In this case, a read request may be satisfied by mapping the identifier to the location in persistent storage without the need for a mapping of the identifier to the node.

The mapping 410 additionally shows an example mapping involving a persistent storage location previously allocated to a node that has been deleted. For example, it may be supposed that node N0 is deleted from the tree data storage structure, and shortly thereafter node Nx' is added to the structure. In this case, the identifier allocated to node N0 (00000001) that is also allocated to the persistent storage location disk 1, at offset 0, having a size X is deallocated from the persistent storage location. In an embodiment of the invention, this identifier is not reused. The persistent storage location, however, may be reused. If after node N0 is deleted, a new node, Nx' is inserted into the tree data storage structure, then the storage module will allocate an identifier to the new node Nx'. As shown in the example mapping 410, the identifier allocated is 111010111. Additionally, this identifier is allocated to the persistent storage location identified as disk 1, offset 0, having a size of X. That is, the identifier allocated to Nx' is allocated to the persistent storage location that was previously allocated for the node N0. Thus, while identifiers may not be reused, the persistent storage locations may be reused, maximizing the storage of the system.

Figure 5:
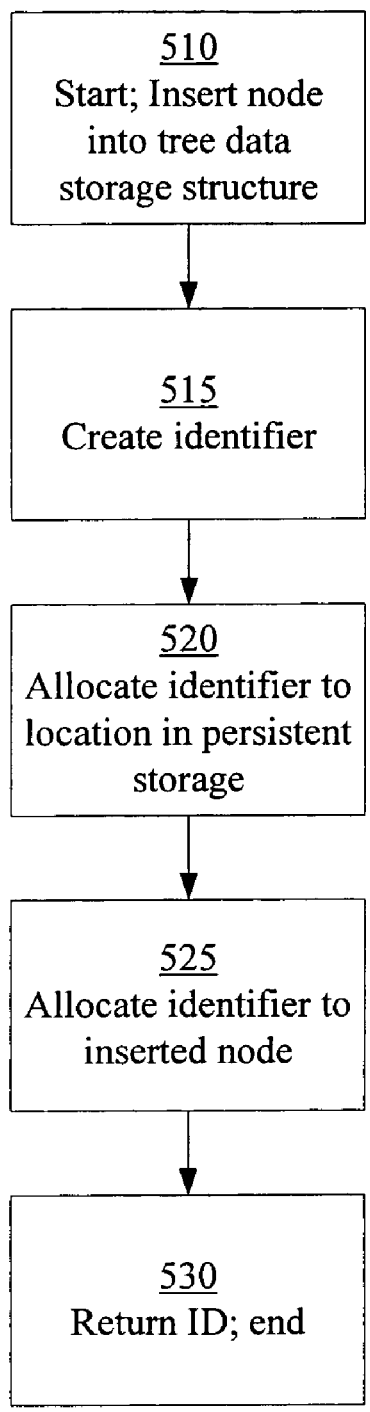
FIG. 5 is a flow diagram of an example method for allocating an identifier in accordance with an embodiment of the invention.

FIG. 5 is a flow diagram of an example method 500 for allocating an identifier in accordance with the invention. The method may commence at step 510 with the insertion of a node in a tree data storage structure. The tree data storage structure may request to read an identifier associated with the inserted node, and at step 515, a storage module may create an identifier. At step 520, the storage module may allocate the identifier to a location in persistent storage. The location in persistent storage may be based on a physical disk number, an offset, and a size associated with the location, or may be based on other appropriate determinations. At step 525 the identifier may be allocated to the inserted node. The identifier may be returned to the tree data storage structure at step 530 to satisfy the read request.

Figure 6:
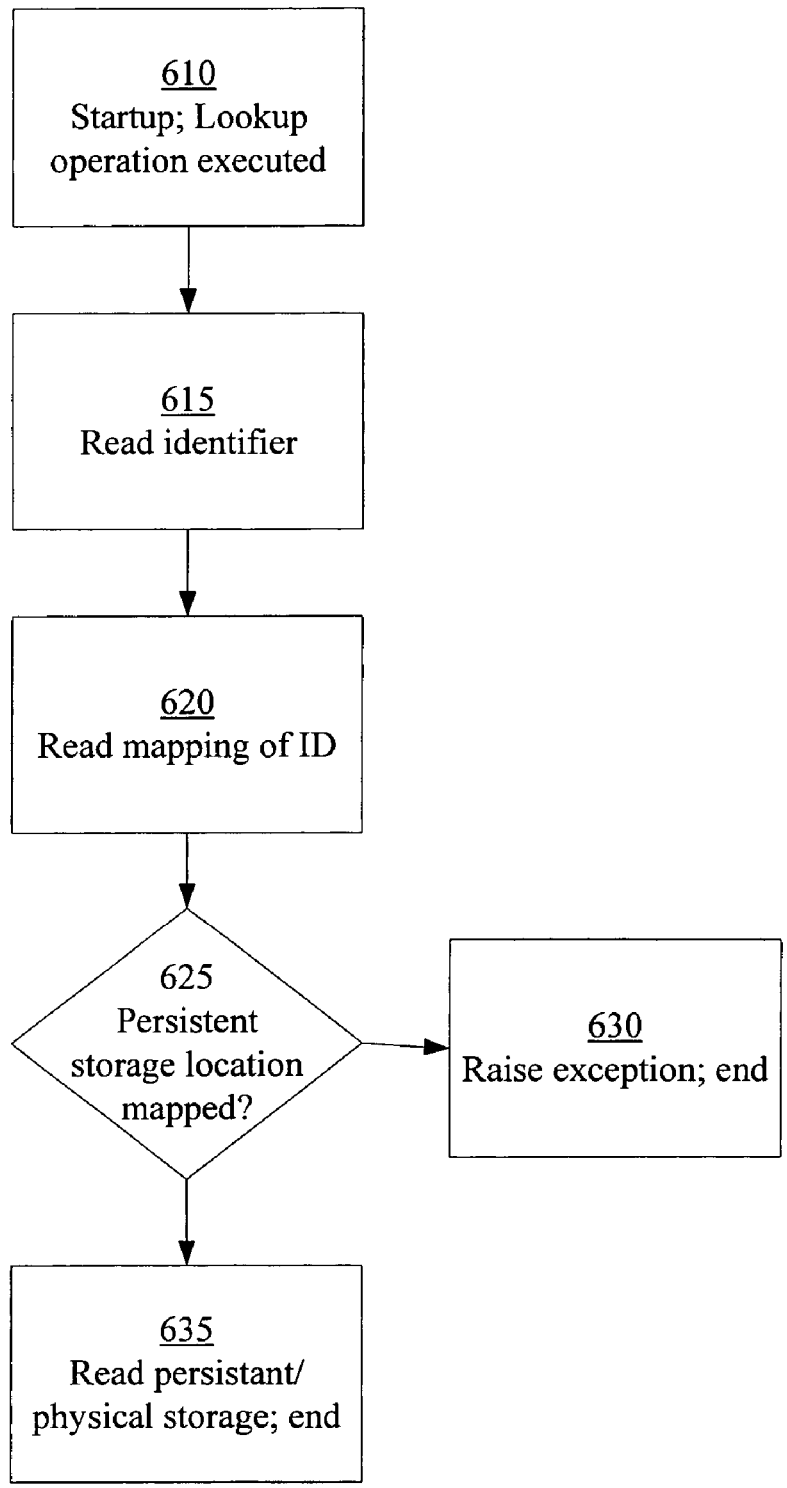
FIG. 6 is a flow diagram of an example method for performing a lookup operation in accordance with an embodiment of the invention.

FIG. 6 is a flow diagram of an example method 600 for performing a lookup operation in accordance with the invention. The method 600 commences at step 610 with a lookup operation being executed to read data associated with a node. At step 615, an identifier associated with the node is read. A mapping of the identifier to a location in persistent storage is read at step 620. At step 625, it is determined whether the identifier is allocated to a persistent storage location. If no persistent storage location is allocated to the identifier, then at step 630, an exception is raised and sent back in lieu of satisfying the lookup request. If a persistent storage location is allocated to the identifier, then at step 635, the data at the location is read to satisfy the lookup request.

Figure 7:
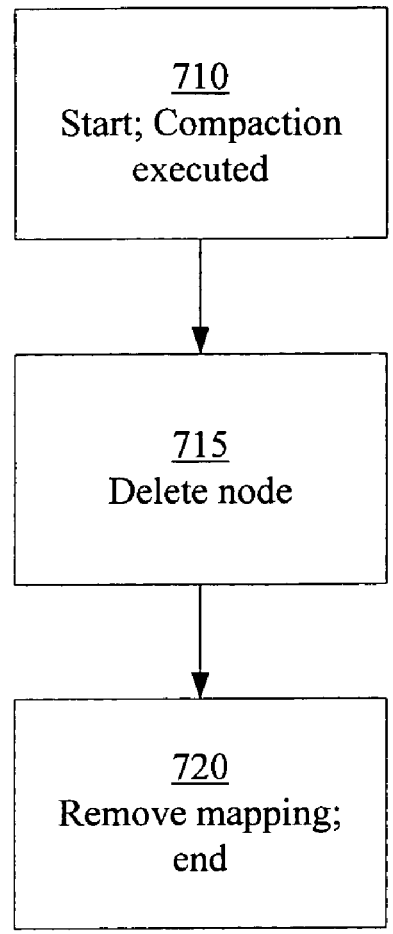
FIG. 7 is a flow diagram of an example method for deleting a node from a tree data storage structure according to an embodiment of the invention.

FIG. 7 is a flow diagram of an example method 700 for deleting a node from a tree data storage structure according to the invention. The method 700 commences at step 710 with execution of compaction. Such compaction may be executed when keys in nodes have been deleted and/or when nodes may be combined with other nodes in the tree data storage structure. At step 715, nodes such as nodes that do not contain keys are deleted from the tree data storage structure. At step 720, the identifiers are deallocated from locations in persistent storage, thus deleting the mapping and disassociating the identifiers from locations in persistent storage. In this way, an exception will be raised if data is attempted to be read from persistent storage regarding a deleted node.

The methods of the present invention may be implemented in hardware, software or, where appropriate, a combination of both. Thus, the methods and apparatus of the present invention, or certain aspects or portions thereof, may take the form of program code (i.e., instructions) embodied in computer readable medium. A processor that executes program code for performing the steps of the methods of the invention, as described in FIGS. 2-7 and as claimed, constitute a computer system that embodies the present invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A computer implemented method for deleting a node from a tree data storage structure,
   the method comprising:
   on a computing device, establishing an operational layer between a tree data storage structure and a persistent storage, wherein the tree data storage structure communicates with the persistent storage via the operational layer, the operational layer being configured to:
   generate an identifier and allocate the identifier to a node in the tree data storage structure;
   associate the identifier with the node of the tree data storage structure, the tree data storage structure being configured to satisfy concurrent operations;

determine location information that indicates a location in the persistent storage, wherein the location information comprises identification of a disk and an offset on the disk;

associate the identifier with the location information, wherein node information associated with the node is stored at the location in the persistent storage; and when a node is deleted from the tree data storage structure, disassociate the identifier from the location information, the method further comprising:

receiving a request for an operation associated with the node;

reading the identifier;

determining that the identifier is not associated with the location information; and sending an exception in response to the request for the operation.

2. The method of claim 1, wherein disassociating the identifier from the location information disassociates the node from the node information.

3. The method of claim 1, further comprising:

receiving a request for an operation associated with the node; determining the location; and retrieving the node information from the location.

4. The method of claim 3, wherein the operation is a lookup request.

5. The method of claim 1, wherein the tree data storage structure is a B-link tree.

6. The method of claim 1, wherein the tree data storage structure is located on a first computer and a second tree data storage structure is located on a second computer, the first and second computers being communicatively coupled, and wherein the second tree data storage structure satisfies an operation associated with the node information.

7. The method of claim 1, wherein at the time of associating the identifier with the node, the identifier was previously not associated with any node in the tree data storage structure.

8. A computer-readable storage medium having program code stored thereon and executed by a computer system, causes the computer system to:

provide an operational layer between a tree data storage structure and a persistent storage, wherein the tree data storage structure communicates with the persistent storage via the operational layer, wherein the operational layer is configured to:

generate an identifier and allocate the identifier to a node in the tree data storage structure;

associate the identifier with the node of the tree data storage structure, the tree data storage structure being configured to satisfy concurrent operations;

determine location information that indicates a location in the persistent storage, wherein the location information comprises identification of a disk and an offset on the disk; associate the identifier with the location information, wherein node information associated with the node is stored at the location in the persistent storage; and when a node is deleted from the tree data storage structure, disassociate the identifier from the location information, the program code further causing the computer system to:

determine that the identifier is not associated with the location information; and send an exception in response to the request for the operation.

9. The computer-readable storage medium of claim 8, wherein disassociating the identifier from the location information disassociates the node from the node information.

10. The computer-readable storage medium of claim 8, having further program code stored thereon that, when executed by the computer system, causes the computer system to:

receive a request for an operation associated with the node;

determine the location; and retrieve the node information from the location.

11. A computer system, comprising:

a processing unit;

a memory that stores a tree data storage structure configured to satisfy concurrent operations;

a persistent storage for storing information associated with each of a plurality of nodes of the tree data storage structure; and a means for establishing an operational layer for enabling the tree data storage structure to communicate with the persistent storage, the operational layer further comprising:

means executing on the processor for generating and associating an identifier with a node of the tree data storage structure, means executing on the processor for determining location information that indicates a location in the persistent storage, wherein said location information comprises identification of a disk and an offset on the disk;

means executing on the processor for associating the identifier with the location information, wherein node information associated with the node is stored at the location in the persistent storage; and means for disassociating the identifier from the storage location when a node is deleted from the tree data storage structure, the persistent storage further comprising:

means executing on the processor for determining that the identifier is not associated with the location information; and means executing on the processor for sending an exception in response to the request for the operation.

12. The computer system of claim 11, wherein the operational layer is in a first location, the data tree storage structure is in a second location distinct from the first location, and the operational layer is in communication with the data tree storage structure.

13. The computer system of claim 12, wherein disassociating the identifier from the location information disassociates the node from the node information.

14. The computer system of claim 11, wherein the operational layer further comprises:

means executing on the processor for receiving a request for an operation associated with the node;

means executing on the processor for determining the location; and means executing on the processor for retrieving the node information from the location.

15. A computer implemented method for deleting a node from a tree data storage structure, the method comprising:

on a computing device, establishing an operational layer between a tree data storage structure and a persistent storage, wherein the tree data storage structure communicates with the persistent storage via the operational layer, the operational layer being configured to: generate an identifier and allocate the identifier to a node in the tree data storage structure;

associate the identifier with the node of the tree data storage structure, the tree data storage structure being configured to satisfy concurrent operations;

determine location information that indicates a location in the persistent storage, wherein the location information comprises identification of a disk and an offset on the disk;
associate the identifier with the location information, wherein node information associated with the node is stored at the location in the persistent storage; and
when a node is deleted from the tree data storage structure, disassociate the identifier from the location information,
wherein being configured to satisfy concurrent operations includes being configured to either:
performing an insertion operation concurrently with a deletion operation, wherein the deletion operation includes deleting the node and removing any mapping to the node; or
performing an insertion operation concurrently with a lookup operation, wherein the lookup operation includes reading the identifier associated with the node, reading the mapping of the identifier and determining whether the identifier is allocated to a location in persistent storage, and wherein the lookup operation further includes:
raising an exception and sending the exception back in lieu of satisfying the lookup request, when no persistent storage location is allocated to the identifier, or
reading the data at the persistent storage location, when a persistent storage location is allocated to the identifier.

* * * * *